C. W. COURTNEY.
SUBIRRIGATED FLOWER AND LAWN BOX.
APPLICATION FILED OCT. 10, 1913.
1,129,554.
Patented Feb. 23, 1915.
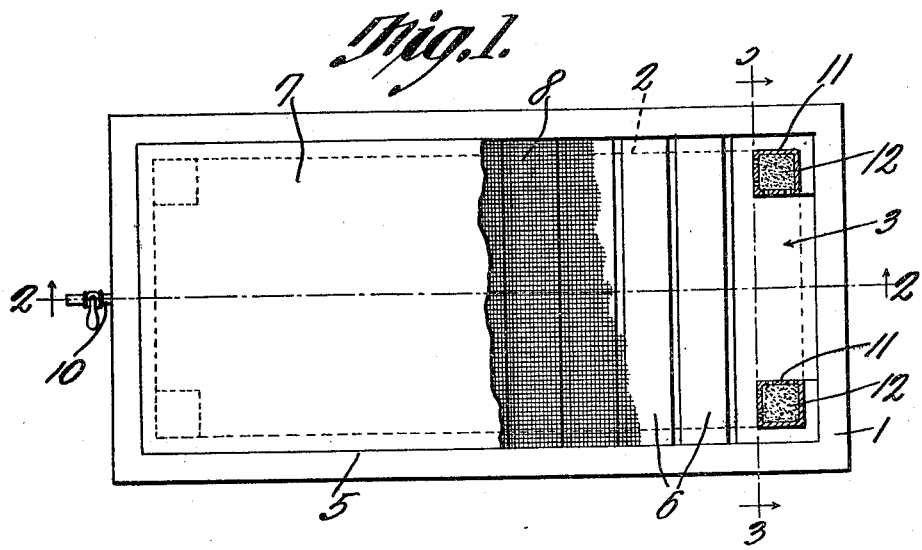
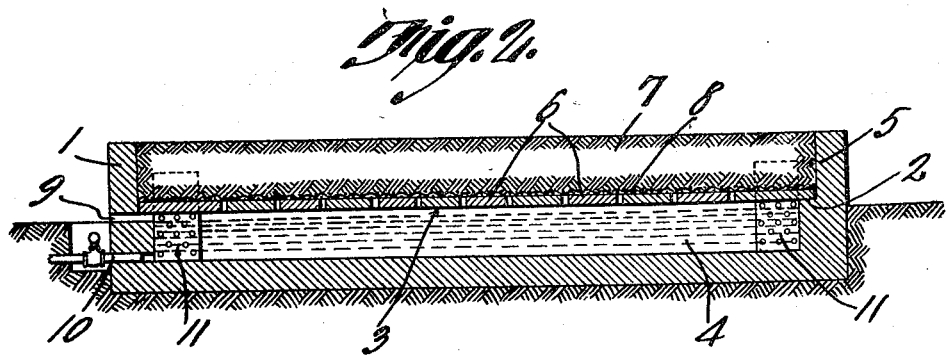
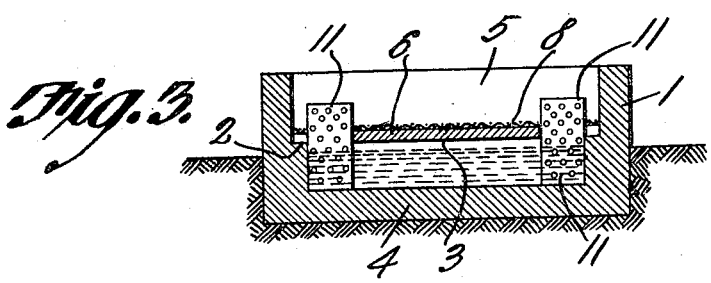
Witnesses
Cyrus W. Courtney
Inventor
by C. A. Snow & Co.
Attorneys

UNITED STATES PATENT OFFICE.

CYRUS WILLIAM COURTNEY, OF GRANTS PASS, OREGON.

SUBIRRIGATED FLOWER AND LAWN BOX.

1,129,554. Specification of Letters Patent. Patented Feb. 23, 1915.

Application filed October 10, 1913. Serial No. 794,487.

*To all whom it may concern:*

Be it known that I, CYRUS WM. COURT-NEY, a citizen of the United States, residing at Grants Pass, in the county of Josephine and State of Oregon, have invented a new and useful Subirrigated Flower and Lawn Box, of which the following is a specification.

The present invention appertains to flower and lawn boxes, and aims to provide a novel and improved device of that character.

The object of the present invention is to provide a box of the nature indicated, adapted to contain an upper layer of loam or soil to form a flower bed, or the like, and providing a water reservoir below the flower bed for sub-irrigating the same.

It is also within the scope of the invention to provide a device of the character specified, embodying a novel or unique assemblage of the parts, to attain the results desired in a highly advantageous manner, and in order that the device may be comparatively simple, durable and inexpensive in construction, as well as ornamental in appearance.

With the foregoing and other objects in view which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing wherein:—

Figure 1 is a plan view of the device, parts being broken away. Fig. 2 is a longitudinal section of the device taken on line 2—2 of Fig. 1. Fig. 3 is a transverse section taken on the line 3—3 of Fig. 1.

In carrying out the invention, there is provided a box 1, preferably constructed or molded of concrete, cement or other such material, and the sides and ends of which are provided with the inner shoulders or ledges 2 intermediate the bottom of the box and the upper edges of the sides and ends. The box 1 may be constructed of various sizes or proportions, and in various shapes, as may be desired, and according to the uses to which the devices may be put.

Seated upon the shoulders or ledges 2, is a flooring 3 which defines the loam or soil receptacle 5 thereabove, and the water reservoir 4 therebelow. The flooring 3 is preferably constructed of spaced concrete slabs 6, although other materials may be employed, and a sheet of fabric of fine mesh is preferably disposed on the flooring 3 as indicated at 8 to support the loam or soil 7 upon the flooring. The loam or soil 7 forms the flower bed, and is preferably flush with the upper edges of box. The fabric 8 serves to support the loam or soil above the flooring, in order to prevent the loam or soil from sifting through the flooring into the water reservoir.

One end of the box is provided with a duct or opening 9 directly below the plane of the flooring 3, in order to permit the water reservoir to be filled, and in order to permit the excess water to be discharged and thereby preclude the water level rising above the flooring into the flower bed. The said end of the box is also preferably provided with a drain cock 10 at the bottom of the box in order to permit the water to be drained off during the winter or cold season so as to prevent the water from freezing and thereby fracturing the box.

Disposed within each corner of the box is a hollow column or receptacle 11, which is filled with sand 12, and perforated throughout, the columns 11 seating on the bottom of the box and extending into the flower bed 7. The endmost slabs 6 and the end portions of the fabric 8 are cut away to permit the passage of the columns or receptacles 11.

The present device may be adapted for various purposes, as will be apparent. Thus the device may be employed in parks, lawns or the like, for ornamental purposes, or may be employed in cemeteries, as grave markers or cradles to supplant or replace the usual mound.

In practice, the box is set into the soil, to permit the upper portion thereof to be exposed above the surface of the soil, to form a coping. The flowers or vegetation may be planted in the loam or soil 7, and will be irrigated from below, by the water within the reservoir. The irrigation may be facilitated by the sand columns 11 which will raise the water by capillary action to the bed 7, the fine sand or filling of the columns 11 permitting such action to ensue. The irrigation of the flower bed will also be promoted by the evaporation of the water, it being obvious that air may be admitted through the opening 9, so as to pass upwardly through the flower bed, to assist in the cultivation or growth of the flowers or other vegetation. During a rainy season, the water percolating through the flower bed will be collected in the reservoir or water may be let into the reservoir through the opening 9, as will be apparent, in order that sufficient water may be had in the reservoir to supply the flower bed with moisture during extended dry seasons. As above stated, the opening 9 will prevent the box from being excessively filled with water, the water level being maintained below the flooring 3.

The present device may also be found useful for horticultural purposes, for cultivating plants, in order that they may be transplanted when sufficiently matured.

The columns 11 may be disposed at different positions, and may be of various shapes, so as to most effectively distribute the moisture. A layer of sand is also preferably placed under the loam upon the flooring.

Having thus described the invention, what is claimed as new is:—

A device of the character described comprising a rectangular box, the sides and ends of which are provided with inner ledges, a flooring embodying spaced transverse slabs seated upon the ledges and defining a soil receptacle thereabove and a water reservoir therebelow, a sheet of fabric disposed on the flooring to support the soil against sifting through the flooring, the end slabs having cut away portions at the corners of the box, hollow perforated columns passing through the said cut away portions, the said columns fitting with the said corners of the box and being seated upon the bottom thereof, and a fine granular filling for each column to raise the water by capillary attraction, the box having an opening directly below the flooring and a lower drain pipe having a valve interposed therein.

In testimony that I claim the foregoing as my own, I have hereto affixed my signature in the presence of two witnesses.

CYRUS WILLIAM COURTNEY.

Witnesses:
W. B. SHERMAN,
EDW. H. RICHARD.